United States Patent [19]

Peterson

[11] Patent Number: 5,228,921
[45] Date of Patent: Jul. 20, 1993

[54] METHODS FOR REMOVING CONTAMINANTS FROM CONTAMINATED SOLIDS (I)

[75] Inventor: Robert L. Peterson, Liverpool, N.Y.

[73] Assignee: GRC Environmental, Inc., E. Syracuse, N.Y.

[21] Appl. No.: 797,778

[22] Filed: Nov. 25, 1991

[51] Int. Cl.⁵ .............................. B08B 3/08; B08B 7/00
[52] U.S. Cl. ...................................... 134/25.1; 134/42; 134/10; 241/21
[58] Field of Search .......................... 134/25.1, 42, 10; 241/21

[56] References Cited

U.S. PATENT DOCUMENTS 4,447,541  5/1984  Peterson ................ 134/42
4,574,013  3/1986  Peterson ................ 134/2

FOREIGN PATENT DOCUMENTS 02592  7/1991  World Int. Prop. O. ........... 241/21

Primary Examiner—Theodore Morris
Assistant Examiner—Zeinab El-Arini
Attorney, Agent, or Firm—Hughes & Multer

[57] ABSTRACT

A method of removing halogenated organic contaminants from contaminated solids in which the solids are comminuted as necessary to resolve them into particles with a top size of typically not more than 15 cm. The particulate solids are slurried with a contaminant extraction agent which is a mixture of an alcohol solvent, an alkali hydroxide, and a sulfoxide catalyst in an environment which results in contaminant(s) being scrubbed from the solids particles larger than 2 mm can then be separated out and processed separately, typically by surficial cleaning. A slurry of the remaining particles and the contaminant extraction agent is agitated for a period which is sufficiently long to separate additional contaminant(s) from the smaller sized particles. The slurry is thereafter resolved into a predominantly liquid phase containing fines and one or more less contaminated, separately treatable fractions in which solids predominate.

16 Claims, 1 Drawing Sheet

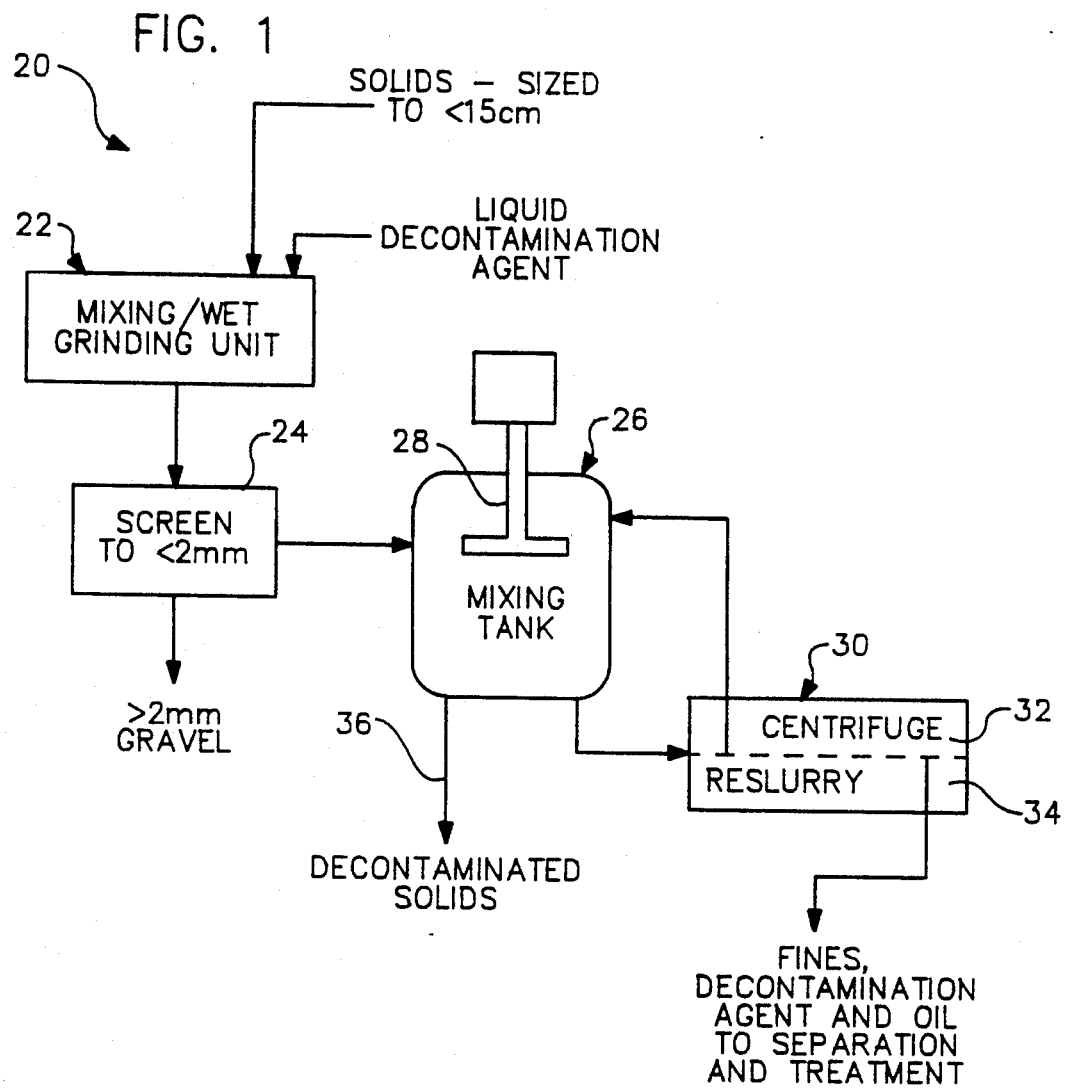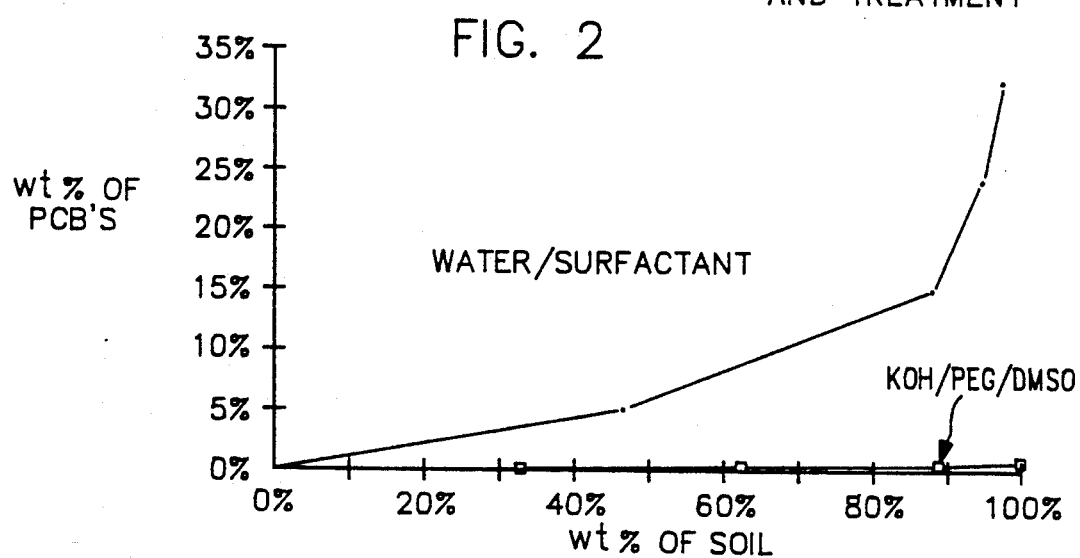

METHODS FOR REMOVING CONTAMINANTS FROM CONTAMINATED SOLIDS (I)

TECHNICAL FIELD OF THE INVENTION

The present invention relates to novel, improved methods for removing halogenated organic contaminants from contaminated solids.

BACKGROUND OF THE INVENTION

The disposal of improperly stored and discarded hazardous solids is a major and worldwide environmental problem. Some of these improper disposal sites are extremely large with U.S. sites such as New Bedford Harbor and the Hudson River having millions of tons of polychlorinated biphenyl (PCB) and oil contaminated sediments. Worldwide, tens of thousands of sites are estimated to require cleanup with multimillion dollar per site cleanup costs being common.

This existence of large numbers of extensively contaminated sites has created a major need for low cost methods of treating contaminated solids.

Direct treatment methods such as incineration and dechlorination (Peterson Pat. No. 4,574,013, Rogers et al. Pat. No. 5,019,175) are very effective for cleaning up solids contaminated with organics. However, such methods are relatively expensive and generally operate at elevated temperatures (150° to 1500° C.).

To reduce the cost, contaminated solids may be pretreated before direct methods are applied.

Soil washing and solvent extraction are well-known methods for pretreating contaminated solids. Soil washing refers generally to processes using water as the primary solvent while solvent extraction implies a use of solvents other than water. In processing contaminated soils, soil washing has been extensively used in Europe for sandy solids; but "treatment of high clay soils has not been proven" (NTIS PB89-212656 "Cleaning Excavated Soil using Extraction Agents: A State of the Art Review", p. 15). In general, the European soil washing procedures are limited to materials with a maximum of 20-30% fines (<63 micron) (NTIS PB90-106428 "Assessment of International Technologies for Superfund Applications: Technology Review and Trip Report Results").

Soil washing processes such as those of Trost (U.S. Pat. No. 4,783,263), Giguere (U.S. Pat. No. 4,336,136) and Yoshida (U.S. Pat. No. 4,555,345) generally use water amended with caustics and surfactants such as soaps to cause the oily contaminants to separate from the clean solids. The oil and contaminated fines are removed by froth flotation. Solvent extraction processes such as those of Weitzman (U.S. Pat. No. 4,662,948), Keane (U.S. Pat. No. 4,610,729), Steiner (U.S. Pat. No. 4,801,384) and Morris (U.S. Pat. No. 4,606,774) use volatile chlorinated solvents or light hydrocarbon solvents to dissolve contaminants; and they then use standard separation methods such as filtration to separate the contaminated liquids from the clean solids.

In soil washing and solvent extraction, large volumes of solvent or water, generally ten to fifteen times the volume of the solids, are required to achieve effective extraction. This is a major drawback of these processes since the amount of material handled strongly affects the overall processing costs.

Thus, there is an existing and continuing need for a low cost method of pretreating contaminated solids and thereby reducing the cost of subsequently treating those solids by direct methods such as incineration and dechlorination. Further needed is a decontamination process of that character which generates less waste than washing and solvent extraction techniques.

SUMMARY OF THE INVENTION

Disclosed herein are certain new and improved methods for decontaminating solids which use a combination of solvation and size separation to so decontaminate a volume of solids as to resolve the solids into a clean fraction and a dirty fraction. Instead of the 5-15 volumes of solvent per volume of solids required in soil washing and solvent extraction processes to achieve >90% contaminant reduction in 90% of the original solids, the processes disclosed herein require as little as one-half to one volume of solvent to one volume of solids to provide much more efficient solids decontamination.

Thus, the amount of material that needs to be handled is materially reduced; and there is a corresponding reduction in processing costs.

In the novel decontamination processes disclosed herein, the solids being treated are slurried with a decontamination agent which is a mixture of an alkali metal hydroxide, an alcohol, and a liquid sulfoxide catalyst. After agitation for an appropriate period of time, the most contaminated light fraction is separated from the only slightly contaminated bottoms by settling or centrifugation. All that is typically required to reduce the contamination of the bottoms to an acceptable level is an aqueous rinse. The more contaminated light fraction—generally made up of liquids and fines—can be processed as described in Peterson Pat. No. 4,574,013 or in any other appropriate fashion.

An up to 99% removal of contaminants from 95% of the soil being treated may be obtained in a single pass using as little as one volume of solvent per volume of solids.

From the foregoing, it will be apparent to the reader that one important object of the present invention is the provision of novel, improved methods for decontaminating solids.

Other important objects as well as additional features and advantages of the invention will be apparent to the reader from the foregoing and the appended claims and as the ensuing detailed description and discussion proceeds in conjunction with the accompanying drawing.

BRIEF DESCRIPTION OF THE DRAWINGS

FIG. 1 is a schematic illustration of one system in which solids can be decontaminated by methods employing the principles of the present invention; and FIG. 2 is a graph comparing the results achieved by a process as disclosed herein with those of a conventional solids decontamination process.

DETAILED DESCRIPTION OF THE INVENTION

The first step in decontaminating solids by the novel technique disclosed herein is to comminute the solids to be treated if, and as, necessary to reduce the solids to a top size <15 cm.

The solids and a liquid decontamination agent are then introduced into a mixer in proportions ranging from 0.5 to two volumes of decontamination agent to one volume of the solids to be treated and formed into a slurry. A rotary mixer which is capable of providing deagglomeration and further comminution by wet grinding such as a cement mixer is suitable, but other type of mixers may be used.

As discussed above, the liquid decontamination agent is a mixture of alkali metal hydroxide, alcohol and liquid sulfoxide. The preferred alkali metal hydroxide for the solids decontamination process disclosed herein because of its fast reaction rates coupled with its modest cost is potassium hydroxide. However, sodium hydroxide can also be employed as can lithium, cesium, and rubidium hydroxides. The last three hydroxides, though, are currently too expensive to be practical. Both mono and dihydric alcohols can be used.

Of the monohydric alcohols, benzyl alcohol is preferred because it is an extremely powerful reagent, yet has a relatively low molecular weight. Other aromatic alcohols can also be employed as can the higher aliphatic alcohols such as octanol although the latter does not perform as well as benzyl alcohol. Lower aliphatic alcohols-notably methyl alcohol-perform very poorly. Operable dihydric alcohols include ethylene glycol, propylene glycol, and polyethylene glycols (PEG's), particularly those having a molecular weight of 200–6000.

Generally speaking, sulfoxides are, as a class, useful as catalysts in the novel processes disclosed herein. Dimethyl sulfoxide (DMSO) is the preferred sulfoxide catalyst. Sulfolane (tetramethylene sulfone) is an example of another sulfoxide catalyst that can be employed. The relative proportions of alkali metal hydroxide, alcohol, and sulfoxide in the decontamination agent are not critical as the activity of the agent is increased in proportion to the amount of sulfoxide catalyst present up to an as yet undefined limit where so much sulfoxide is present in the reaction mixture that it inhibits the requisite contact between the alkali metal hydroxide constituent of the decontamination agent and the organic contaminant. Treatment agents formulated as described in the following table are contemplated, but the values disclosed in that table are not to be taken as limiting:

TABLE 1

| Constituent | Percent by Mass |
| --- | --- |
| Alkali Metal Hydroxide | 1:50 |
| Alcohol | 30:90 |
| Sulfoxide | 10:90 |

Preferred is a decontamination agent made up of potassium hydroxide, PEG, and dimethylsulfoxide in essentially equal mass proportions.

The solids and liquid are mixed for sufficient time to scrub the contaminants from the surfaces of the solids and to separate agglomerated particles by a mixture of wetting and mechanical attrition. This will typically take 0.5 to 2 hours.

The slurry is then passed through an appropriate sieve such as a conventional vibrating screen to remove all particles >2 mm in size. The materials that don't pass thru the screen are generally too large to hold significant amounts of contaminant after the surficial cleaning in the mixer. Therefore, they may be rinsed, analyzed and discarded.

The liquid and solids <2 mm are transferred from the mixer to a continuous mixing tank capable of sufficient agitation to maintain the solids in a suspended state. Contaminants are separated from the <2 mm fines in this tank.

The mixture of decontamination agent and <2 mm solids is continuously pumped from the mixing tank into a gravity settling device or centrifuge or similar device. This results in the liquid/solids mixture being separated into a light fraction and a heavy fraction. The light fraction, consisting of contaminated liquid and very small contaminated particles (fines), is continuously removed from the settling device for further separation and treatment—by the technique disclosed in Peterson Pat. No. 4,544,013, for example. "Clean" decontamination agent is mixed with the heavy fraction to from a new slurry, which is pumped back to the continuous mixing tank.

One important advantage of the novel decontamination process just described is that a high proportion of the contaminants can be removed from contaminated solids at a comparatively modest cost. Another important advantage over many heretofore proposed processes for decontaminating solids is that it can be carried out over a wide, low temperature range of 20°–150° C.

FIG. 1 depicts an exemplary system 20 in which the novel solids/decontamination process just described can be carried out.

The initial component in system 20 is a mixer 22 into which the solids to be decontaminated—previously comminuted if, and as, necessary to a <15 cm top size—are introduced, typically on an equal volume basis. In mixer 22: (1) the solids are wet ground to an extent which resolves any agglomerates into individual particles and perhaps effects some reduction in particle size; and (2) the solids and decontamination agent are intimately mixed, which results in the separation of contaminants from the solids, particularly those particles of larger size.

Once the mixing process is completed, the solvents/decontamination agent slurry is transferred to a sizing device 24 such as the illustrated screen or sieve. This device resolves the slurry into >2 mm solid particles, which are trapped on the screen, and a mixture of liquid and smaller particles.

As indicated above, the process carried out in mixer 22 is particularly effective in removing contaminants from the larger particles of solids. Typically, therefore, rinsing with water or a water/detergent solution is all that is required to reduce the contamination of these larger sized particles to an acceptable level.

The mixture of liquid and smaller particles is transferred from screening device 24 to a mixing tank 26 equipped with a conventional, motor driven agitator or impeller 28. Agitator 28 is operated at a sufficiently high speed to keep the solid particles suspended in the liquid phase in tank 26. This results in additional contaminants being separated from the smaller particles in that tank.

Suspension is continuously pumped from mixing tank 26 into a unit 30 which includes a settling or separation device such as a centrifuge 32 and a reslurry section 34. Here, the suspension is separated into a light fraction consisting of: (1) contaminated decontamination agent, fines, and, typically, an oil in which the contaminant(s) are dissolved or suspended; and (2) a heavy fraction consisting principally of <2 mm particles.

The mixture of fines, decontaminating agent, and (typically) oil is transferred elsewhere for separation and treatment as disclosed, for example, in Peterson Pat. No. 4,574,013. The heavier fraction(s) or bottoms are mixed with "clean" decontamination agent in the reslurry section 34 of unit 30 and recirculated to mixing tank 26 for further separation of contaminants from those solids.

Periodically, the status of the solids in mixing tank 26 is ascertained, typically by withdrawing a sample of solids through discharge line 36 and analyzing those solids for contamination. Once the contamination has been reduced to an acceptable level: (1) the now decontaminated solids are discharged from mixing tank 26 through line 36, (2) any liquids associated with those solids recovered, and (3) a new batch of contaminated solids is introduced into the mixing tank 26 from mixing/wet grinding unit 22 by way of sieve unit 24.

The utility of the solids decontamination process disclosed herein was verified by tests employing authentic contaminated solid samples obtained from contaminated sites. Equal 200 g. samples of solids and liquid were placed in a tall graduated cylinder. The cylinder was held in a water bath to maintain constant temperature. The solids and liquid were mixed for a period of 10 minutes. Thereafter, the samples were allowed to settle for 80 minutes. The column was then divided into one light fraction or liquid layer (top) and four equal volume solid layers (bottom). Aliquots of each layer were analyzed by standard methods to determine the levels of contamination.

EXAMPLE 1

A dry sandy soil from Site 1 contaminated with PCBs was treated with two decontamination agents —a water/surfactant mixture and a mixture of KOH/PEG/DMSO containing equal proportions of these constituents—using the protocol just described. The KOH/PEG/DMSO mixture removed 99% of the PCBs from 95% of the original soil using one volume of reagent per volume of solids. The water/surfactant mixture removed only 75% of the PCBs from 95% of the soil using the same solvent:solids ratio.

The data showing the effect of the two treatment agents on the contaminated Site 1 solids appears in graphical form in FIG. 2.

EXAMPLE 2

A sticky, high clay (88% <74 μm), PCBs contaminated soil from Site 2 was decontaminated, using the above-described protocol. A total of 86% of the initial PCBs were removed from the contaminated soil in a single pass with one volume of KOH/PEG/DMSO reagent per volume of soil.

This is both a significant and surprising result. Conventional soil washing decontamination processes simply cannot handle soils with a clay content >30% at all.

The invention may be embodied in forms other than those described above without departing from the spirit or essential characteristics of the invention. The specifically disclosed embodiments are therefore to be considered in all respects as illustrative and not restrictive, the scope of the invention being indicated by the appended claims rather than by the foregoing description and the drawings. All changes which come within the meaning and the range of equivalency of the claims are intended to be embraced therein.

What is claimed is:

1. A method for removing halogenated organic contaminants from solids contaminated therewith, said method including the steps of:

comminuting the contaminated solids as necessary to produce a body of particles with a top size <15 cm, at least some of which are contaminated;

mixing with the particles in an amount sufficient to form a slurry of contaminant extraction agent consisting essentially of an alkali or alkali earth metal hydroxide, a liquid sulfoxide, and an alcohol;

agitating the thus formed slurry of contaminant extraction agent and particles of solids for a period of time which is effective to separate the contaminant from the contaminated particles;

thereafter resolving the slurry formed by the mixing of the contaminant extraction agent into a fraction which is predominately liquid and fines and at least one, predominantly particulate fraction; and separately handling the fractions into which the slurry is resolved.

2. A method as defined in claim 1 in which the alcohol of the contaminant extraction agent is a polyethylene glycol.

3. A method as defined in claim 2 in which the polyethylene glycol has a molecular weight in the range of 200 to 6000.

4. A method as defined in claim 1 in which the hydroxide of the contaminant extraction agent is sodium hydroxide.

5. A method as defined in claim 1 in which the liquid sulfoxide is dimethylsulfoxide.

6. A method as defined in claim 1 in which the volume ratio of contaminant extraction agent to solids in the slurry is in the range of 0.5-1:1.

7. A method as defined in claim 1 in which:
the alcohol in the slurry is a polyethylene glycol with a molecular weight in the range of 200 to 6000;
the hydroxide is sodium hydroxide;
the liquid sulfoxide is dimethylsulfoxide; and
the alcohol, hydroxide, and sulfoxide are present in following proportions in mass:

| Polyethylene Glycol | 1-50 |
| Sodium Hydroxide | 30-90 |
| Dimethylsulfoxide | 10-90. |

8. A method as defined in claim 1 in which the constituents of the contaminant extraction agent are recovered from the predominantly liquid phase into which the slurry is resolved and then recycled.

9. A method as defind in claim 1 which is carried out at a temperature in the range of 20°-150° C.

10. A method as defined in claim 1 in which the contaminant extraction agent consists essentially of a polyethylene glycol having a molecular weight in the range of 200 to 6000, sodium hydroxide, and dimethylsulfoxide in essentially equal following proportions.

11. A method as defined in claim 1 in which:
the slurry is agitated as aforesaid in a mixing tank; and
decontaminated solids are periodically removed from said mixing tank.

12. A method as defined in claim 1 in which wet grinding in the contaminant extraction agent is employed to comminute the contaminated solids.

13. A method for removing halogenated organic contaminants from solids contaminated therewith, said method including the steps of:

comminuting the contaminated solids as necessary to produce a body of particles with a top size <15 cm, at least some of which are contaminated;

mixing with the particles in an amount sufficient to form a slurry a contaminant extraction agent consisting essentially of an alkali or alkali earth metal hydroxide, a liquid sulfoxide, and an alcohol;

agitating the thus formed slurry of contaminant extraction agent and particles of solids for a period of time which is effective to separate the contaminant from the contaminated particles;

thereafter resolving the slurry formed by the mixing of the contaminant extraction agent into a fraction which is predominately liquid and fines and at least one, predominantly particulate fraction; and separately handling the fractions into which the slurry is resolved.

14. A method for removing halogenated organic contaminants from solids contaminated therewith, said method including the steps of:

comminuting the contaminated solids as necessary to produce a body of particles with a selected top size, at least some of which are contaminated;

mixing with the particles in an amount sufficient to form a slurry a contaminant extraction agent consisting essentially of an alkali or alkali earth metal hydroxide, a liquid sulfoxide, and an alcohol;

agitating the thus formed slurry of contaminant extraction agent and particles of solids for a period of time which is effective to separate the contaminant from the contaminated particles;

thereafter so resolving the slurry formed by the mixing of the contaminant extraction agent into one fraction which is predominately liquid and fines and at least one, predominantly particulate fraction that particles in any predominately solids fraction have a size >2 mm and the particles in the predominantly liquid fraction are smaller;

and separately handling the fractions into which the slurry is resolved.

15. A method for removing halogenated organic contaminants from solids contaminated therewith, said method including the steps of:

comminuting the contaminated solids as necessary to produce a body of particles with a selected top size, at least some of which are contaminated;

mixing with the particles in an amount sufficient to form a slurry a contaminant extraction agent consisting essentially of an alkali or alkali earth metal hydroxide, a liquid sulfoxide, and an alcohol;

agitating the thus formed slurry of contaminant extraction agent and particles of solids for a period of time which is effective to separate the contaminant from the contaminated particles;

thereafter resolving the slurry formed by the mixing of the contaminant extraction agent into a fraction which is predominately liquid and fines and at least one, predominantly particulate fraction;

removing particles of a size >2 mm from the slurry after the contaminant extraction agent is mixed with the particulate but before the agitation of the slurry is effected; and first surficially cleaning and then disposing of said particles.

16. A method as defined in claim 15 in which:

the slurry from which the >2 mm particles have been removed is agitated as aforesaid in a mixing tank to remove additional contaminant(s) from the solids; and decontaminated solids are periodically removed from said mixing tank.

* * * * *